(12) United States Patent
Wakisaka et al.

(10) Patent No.: US 9,513,040 B2
(45) Date of Patent: Dec. 6, 2016

(54) ELECTRONIC EXPANSION VALVE, AND AIR CONDITIONER

(71) Applicant: DAIKIN INDUSTRIES, LTD., Osaka-shi, Osaka (JP)

(72) Inventors: Shigetaka Wakisaka, Sakai (JP); Masahiro Oka, Sakai (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 281 days.

(21) Appl. No.: 14/352,759

(22) PCT Filed: Nov. 13, 2012

(86) PCT No.: PCT/JP2012/079417
§ 371 (c)(1),
(2) Date: Apr. 18, 2014

(87) PCT Pub. No.: WO2013/073531
PCT Pub. Date: May 23, 2013

(65) Prior Publication Data
US 2014/0283546 A1    Sep. 25, 2014

(30) Foreign Application Priority Data

Nov. 18, 2011  (JP) ................................. 2011-252738

(51) Int. Cl.
*F25B 41/06* (2006.01)
*F16K 1/36* (2006.01)
*F16K 31/04* (2006.01)

(52) U.S. Cl.
CPC .............. *F25B 41/062* (2013.01); *F16K 1/36* (2013.01); *F16K 31/04* (2013.01); *F16K 31/042* (2013.01); *F25B 41/06* (2013.01)

(58) Field of Classification Search
CPC ...... F25B 41/06; F25B 41/062; F25B 39/02; F25B 41/067

USPC .......... 62/528, 527, 511; 138/40; 251/129.11
See application file for complete search history.

(56) References Cited

U.S. PATENT DOCUMENTS

| 2,863,473 | A | * | 12/1958 | Gantz | ................. F16K 31/0651 137/599.07 |
| 2007/0018128 | A1 | | 1/2007 | Arai | |
| 2009/0294713 | A1 | * | 12/2009 | Harada | ................... F16K 31/04 251/129.15 |

FOREIGN PATENT DOCUMENTS

| JP | H04-71008 | † | 3/1992 |
| JP | 6-83946 U | | 12/1994 |

(Continued)

OTHER PUBLICATIONS

Partial compilation of publication—Kuroiwa et al., "Characteristics of Ratio Control System with a Fuel Control Device Directly Connected to an Air Flow Metering Element", NIT-Electronic Library Service, pp. 739-743 (1987).

(Continued)

*Primary Examiner* — Melvin Jones
(74) *Attorney, Agent, or Firm* — Birch, Stewart, Kolasch & Birch, LLP.

(57) ABSTRACT

An electronic expansion valve includes a valve body, a valve seat, and a stepping motor. A valve portion is formed at a forward end of the valve body. The valve seat forms a variable throttle portion between the valve portion and the valve seat by allowing the valve body to move in an axial direction. The stepping motor moves the valve portion in accordance with a pulse number. At least one part of a side surface of the valve portion is shaped so that an opening degree ratio becomes constant.

18 Claims, 5 Drawing Sheets

(56) References Cited

FOREIGN PATENT DOCUMENTS

| JP | 8-21554 A | | 1/1996 |
|---|---|---|---|
| JP | 10-148420 | † | 6/1998 |
| JP | 10-148420 A | | 6/1998 |
| JP | 10-160034 A | | 6/1998 |
| JP | 2002-122258 | † | 4/2002 |
| JP | 2002-122258 A | | 4/2002 |
| JP | 2005-155878 | † | 1/2005 |
| JP | 2005-155878 A | | 6/2005 |
| JP | 2006-52807 A | | 2/2006 |
| JP | 2007-024206 A | | 2/2007 |
| JP | 2006-052807 | † | 2/2008 |

OTHER PUBLICATIONS

Yuzawa, Satoshi, "Cavitation and Erosion in Control Valves by Pressure Reduction and Flow Regulation of High Pressure Liquid", Waseda University Graduate School of Science and Engineering, Japan, Mar. 2003, Chapters 5-6, pp. 187-222 (Item TH1EE).†

Yuzawa, Satoshi, "Cavitation and Erosion in Control Valves by Pressure Reduction and Flow Regulation of High Pressure Liquid", Waseda University Graduate School of Science and Engineering, Japan, Mar. 2003, Chapter 4, pp. 122-186 (Item TH1DD).†

Yuzawa, Satoshi, "Cavitation and Erosion in Control Valves by Pressure Reduction and Flow Regulation of High Pressure Liquid", Waseda University Graduate School of Science and Engineering, Japan, Mar. 2003, Chapter 3, pp. 60-121 (pp. 61-62 and 76-77 translated) (Item TH1CC).†

Yuzawa, Satoshi, "Cavitation and Erosion in Control Valves by Pressure Reduction and Flow Regulation of High Pressure Liquid", Waseda University Graduate School of Science and Engineering, Japan, Mar. 2003, Chapter 2, pp. 23-60 (pp. 36-38 translated) (Item TH1BB).†

Yuzawa, Satoshi, "Cavitation and Erosion in Control Valves by Pressure Reduction and Flow Regulation of High Pressure Liquid", Waseda University Graduate School of Science and Engineering, Japan, Mar. 2003, Partial Translation; Abstract/Doctoral Thesis Examination Report; Table of Contents; Chapter 1, (Item TH1AA).†

\* cited by examiner
† cited by third party

ELECTRONIC EXPANSION VALVE, AND AIR CONDITIONER

TECHNICAL FIELD

The present invention relates to an electronic expansion valve disposed in a refrigerant circuit of an air conditioner, and relates to an air conditioner.

BACKGROUND ART

A technique disclosed by Patent Document 1 is known as an electronic expansion valve. In this technique, a valve body is provided with a surface substantially parallel to a refrigerant flow path in order to improve the controllability of the amount of refrigerant flow in a small flow range.

When the operation of an air conditioner is in a stable period, the amount of refrigerant flow is required to be slightly adjusted. However, if an increase in the opening area with respect to the minimum movement range of the valve body is great, it will be difficult to increase or decrease the amount of refrigerant flow only slightly. When the amount of refrigerant flow varies exceeding a control allowable range, the valve body is repeatedly moved forwardly or backwardly to finely adjust the opening degree.

In a conventional electronic expansion valve, it is possible to control the amount of refrigerant flow in a small flow range by employing the aforementioned arrangement. However, a basal part of the valve main body is parallel to the side surface of the refrigerant flow path over a predetermined distance, and therefore the opening area can hardly vary even if the valve body moves within this range. In other words, the amount of refrigerant flow hardly varies in some movement places of the valve body, and it is impossible to finely adjust the amount of refrigerant flow.

PRIOR ART DOCUMENT

Patent Document

Patent Document 1: Japanese Laid-Open Patent Publication No. H10-148420

SUMMARY OF THE INVENTION

Problems that the Invention is to Solve

An object of the present invention is to provide an electronic expansion valve capable of finely adjusting the amount of refrigerant flow and provide an air conditioner.

Means for Solving the Problem

To achieve the object, according to a first aspect of the present invention, an electronic expansion valve is provided which includes a valve body whose forward end is provided with a valve portion, a valve seat that forms a variable throttle portion between the valve portion and the valve seat by allowing the valve body to move in an axial direction, and a stepping motor that moves the valve body in accordance with a pulse number. When an area of a cross section of a gap formed between the valve portion and the valve seat and that is perpendicular to the axial direction is defined as an opening area and when an area ratio between an opening area in which the pulse number has not yet been increased and decreased and an opening area in which the pulse number has already been increased and decreased is defined as an opening degree ratio, at least one part of a side surface of the valve portion is shaped so that the opening degree ratio becomes constant.

According to this arrangement, at least one part of the side surface of the valve portion is shaped so that the opening degree ratio becomes constant. Therefore, the opening area increases at a fixed ratio when the valve body is moved. Therefore, the variation ratio of the amount of refrigerant flow becomes constant. Therefore, the amount of refrigerant flow can be finely adjusted. It should be noted that "The opening degree ratio is constant" includes "The opening degree ratio is substantially constant." In other words, besides a curved surface shape in which the opening degree ratio is constant, surface in which a plurality of surfaces are included and a borderline of each surface is disposed on a curved surface is included. Additionally, an approximate curved surface approximated to this curved surface is also included.

Preferably, in the aforementioned electronic expansion valve, the side surface of the valve portion is divided into three or more regions in the axial direction, and a borderline of each of the regions is disposed on a virtual curved surface in which the opening degree ratio becomes constant.

According to this arrangement, the side surface of each region is disposed on the virtual curved surface in which the opening degree ratio becomes constant. Therefore, the side surface of the valve portion is approximated to the virtual curved surface. As a result, the variation ratio of the amount of refrigerant flow becomes substantially constant over the moving range of the valve portion. Therefore, the amount of refrigerant flow can be finely adjusted.

Preferably, in the aforementioned electronic expansion valve, when a length in the axial direction of each of the regions is defined as an interval length, the interval length of each region becomes smaller toward a forward end of the valve portion in order of disposition of the regions.

According to this arrangement, the side surface of each region is disposed on the virtual curved surface in which the opening degree ratio becomes constant. Additionally, the interval length of each region becomes smaller toward the forward end of the valve portion in order of disposition of the regions. Therefore, the amount of variation with respect to the movement amount of the valve portion becomes greater in proportion to an increase in the opening degree, and becomes smaller in proportion to a decrease in the opening degree. As a result, in a small opening degree range, the amount of refrigerant flow can be adjusted with higher accuracy than in a large opening degree range. On the other hand, there is no need to adjust the amount of refrigerant flow with high accuracy in a large opening degree range, and therefore the aforementioned arrangement can contribute to stabilizing the operation of the electronic expansion valve.

Preferably, in the aforementioned electronic expansion valve, when a maximum value of the opening area is defined as a maximum opening area and when a percentage of the opening area with respect to the maximum opening area is defined as an opening degree, the side surface of the valve portion is divided into a first region that corresponds to a part in which the opening degree is from 0% to less than 25%, a second region that corresponds to a part in which the opening degree is from 25% to less than 50%, a third region that corresponds to a part in which the opening degree is from 50% to less than 75%, and a fourth region that corresponds to a part in which the opening degree is from 75% to 100%, and the side surface of each region is a side surface shaped in a truncated cone, and the borderline of each region is disposed on a virtual curved surface in which the opening degree ratio becomes constant.

According to this arrangement, the aspect of the side surface of the valve portion varies whenever the valve portion moves and the opening degree increases by 25%. Additionally, each borderline is disposed on the virtual curved surface in which the opening degree ratio becomes constant. Therefore, the valve portion can be more easily formed than in a case in which the side surface of the valve portion is a curved surface. Additionally, the flow-rate variation ratio can be made substantially constant over the moving range of the valve portion.

Preferably, in the aforementioned electronic expansion valve, when a maximum value of the opening area is defined as a maximum opening area and when a percentage of the opening area with respect to the maximum opening area is defined as an opening degree, the side surface of the valve portion is divided into a first region that corresponds to a part in which the opening degree is from 0% to less than 20%, a second region that corresponds to a part in which the opening degree is from 20% to less than 40%, a third region that corresponds to a part in which the opening degree is from 40% to less than 60%, a fourth region that corresponds to a part in which the opening degree is from 60% to less than 80%, and a fifth region that corresponds to a part in which the opening degree is from 80% to 100%, and the side surface of each region is a side surface shaped in a truncated cone, and the borderline of each region is disposed on a virtual curved surface in which the opening degree ratio becomes constant.

According to this arrangement, the aspect of the side surface of the valve portion varies whenever the valve portion moves and the opening degree increases by 20%. Additionally, each borderline is disposed on the virtual curved surface in which the opening degree ratio becomes constant. Therefore, the valve portion can be more easily formed than in a case in which the side surface of the valve portion is a curved surface. Additionally, the flow-rate variation ratio can be made substantially constant over the moving range of the valve portion.

Preferably, in the aforementioned electronic expansion valve, a visible outline of a cross section including a valve axis of the valve portion satisfies a relation expressed by the two following formulas:

$$r = \sqrt{\frac{S\max - B \cdot \beta^x}{\pi}}$$ [Numerical Formula 1]

$$S\max = B \cdot \beta^{x\max}$$

(wherein x is a length from a basal part of the valve seat to a part corresponding to radius r in the axial direction of the valve portion, xmax is a length from the basal part to the forward end of the valve portion, β is an opening degree ratio, Smax is a maximum opening area, and r is a length (radius) from the valve axis to the side surface of the valve portion).

According to this arrangement, the side surface of the valve portion is a curved surface, and the opening degree ratio is β in the moving range of the valve portion. Therefore, a variation in the flow rate of a refrigerant can be made substantially constant over the moving range of the valve portion.

To achieve the object, according to a second aspect of the present invention, an electronic expansion valve is provided which includes a valve body whose forward end is provided with a valve portion, a valve seat that forms a variable throttle portion between the valve portion and the valve seat by allowing the valve body to move in an axial direction, and a stepping motor that moves the valve body in accordance with a pulse number. In a region at least from the basal part to ⅕ of an interval between the basal part and the forward end of the side surface of the valve portion, an angle θ with respect to the valve axis of the valve portion satisfies the following formula:

$$0 < \tan θ < 0.2$$ [Numerical Formula 2]

According to this arrangement, a region that is near the basal part of the valve portion and that occupies at least ⅕ of an interval between the basal part to the forward end has a side surface shape that satisfies the aforementioned formula. In this case, the opening area can be increased and decreased little by little with respect to the movement of the valve portion. Therefore, the amount of refrigerant flow can be finely adjusted in a small opening degree range.

To achieve the object, according to a third aspect of the present invention, an air conditioner including the aforementioned electronic expansion valve is provided.

According to this arrangement, the amount of refrigerant flow can be finely adjusted, and therefore air-conditioning performance by means of the air conditioner is stabilized.

MODE FOR CARRYING OUT THE INVENTION

An air conditioner according to an embodiment of the present invention will be hereinafter described with reference to FIG. 1 to FIG. 6.

Figure 1:
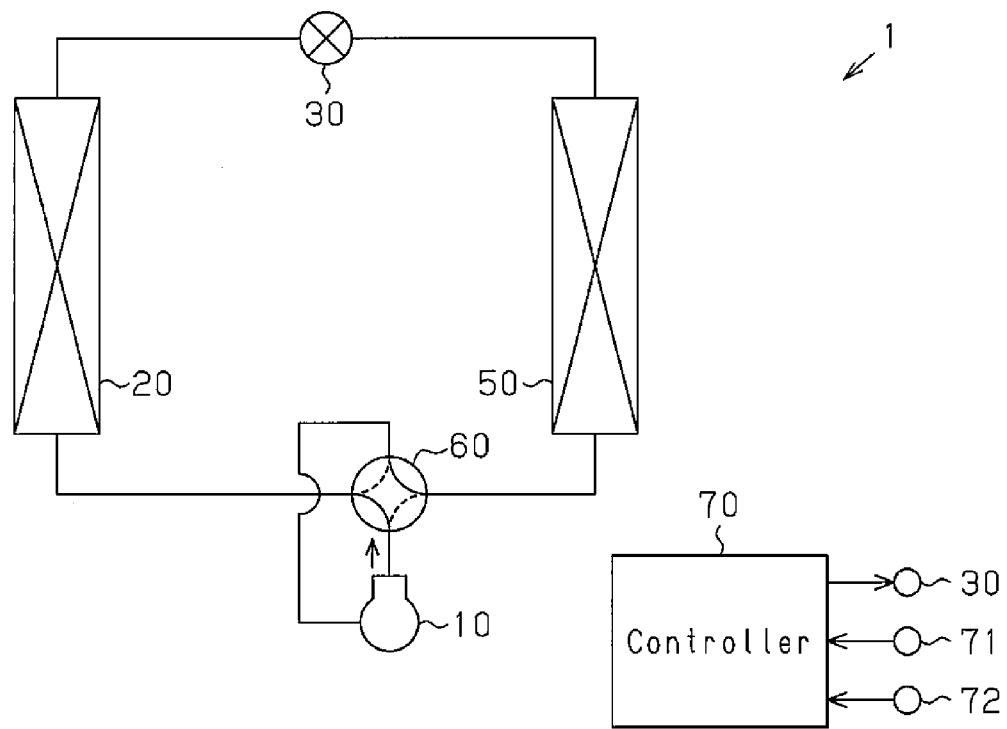
FIG. 1 A schematic view showing the overall structure of an air conditioner according to an embodiment of the present invention.

As shown in FIG. 1, the air conditioner 1 is composed of a compressor 10 that compresses a refrigerant, an outdoor heat exchanger 20 that is disposed outdoors, an electronic expansion valve 30 that expands a refrigerant, an indoor heat exchanger 50 that is disposed indoors, a four-pass change-over valve 60, and a controller 70 that manages and controls each device.

Figure 2:
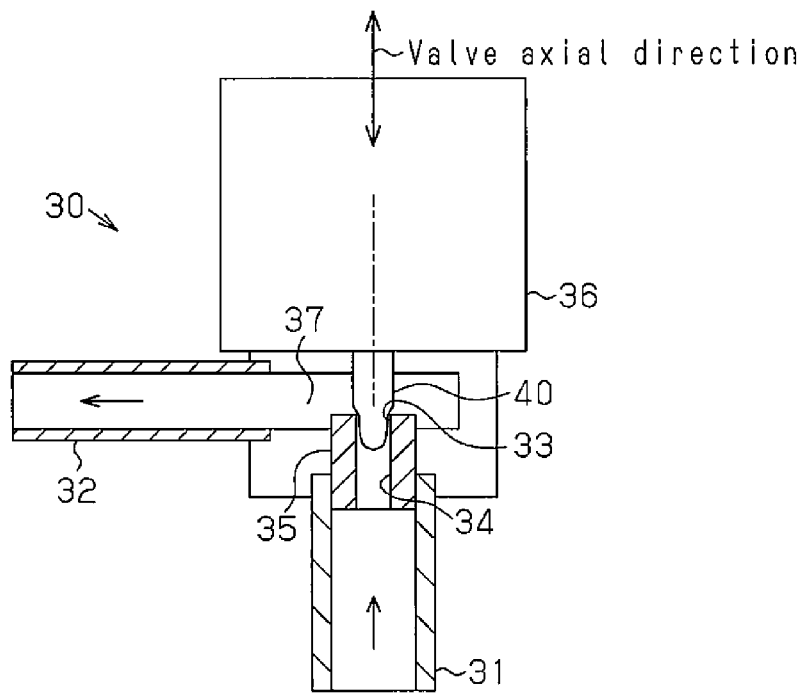
FIG. 2 A partial cross-sectional view showing a cross-sectional structure of an electronic expansion valve.

As shown in FIG. 2, the electronic expansion valve 30 is composed of a first pipe 31 that serves as a gateway for a refrigerant, a second pipe 32, a rod-shaped valve body 40, a valve seat 33, a cylindrical member 35 that has a valve port 34, and a stepping motor 36 that drives the valve body 40 in an axial direction.

The first pipe 31 serves as one gateway of the electronic expansion valve 30. The second pipe 32 serves as the other gateway of the electronic expansion valve 30. The second pipe 32 perpendicularly intersects the first pipe 31. The cylindrical member 35 connects the first pipe 31 and a valve chamber 37 together. A taper portion is formed near the valve chamber 37 of the valve port 34. The taper portion is a constituent of the valve seat 33.

Figure 3A:
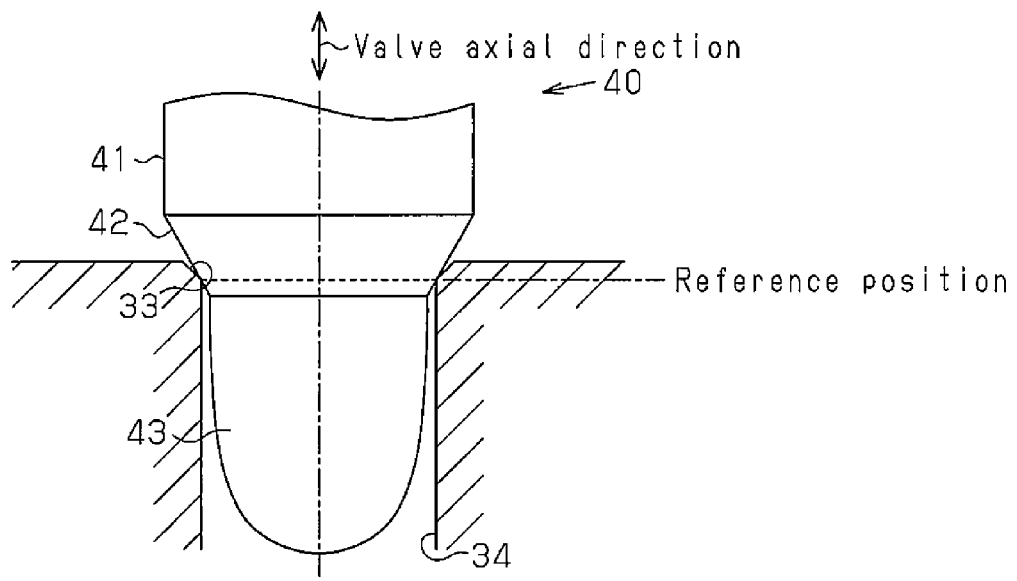
FIG. 3(a) A cross-sectional view near a valve body when the electronic expansion valve is totally closed, FIG. 3(b) A cross-sectional view near the valve body when the electronic expansion valve is in a throttled state.
Figure 3B:
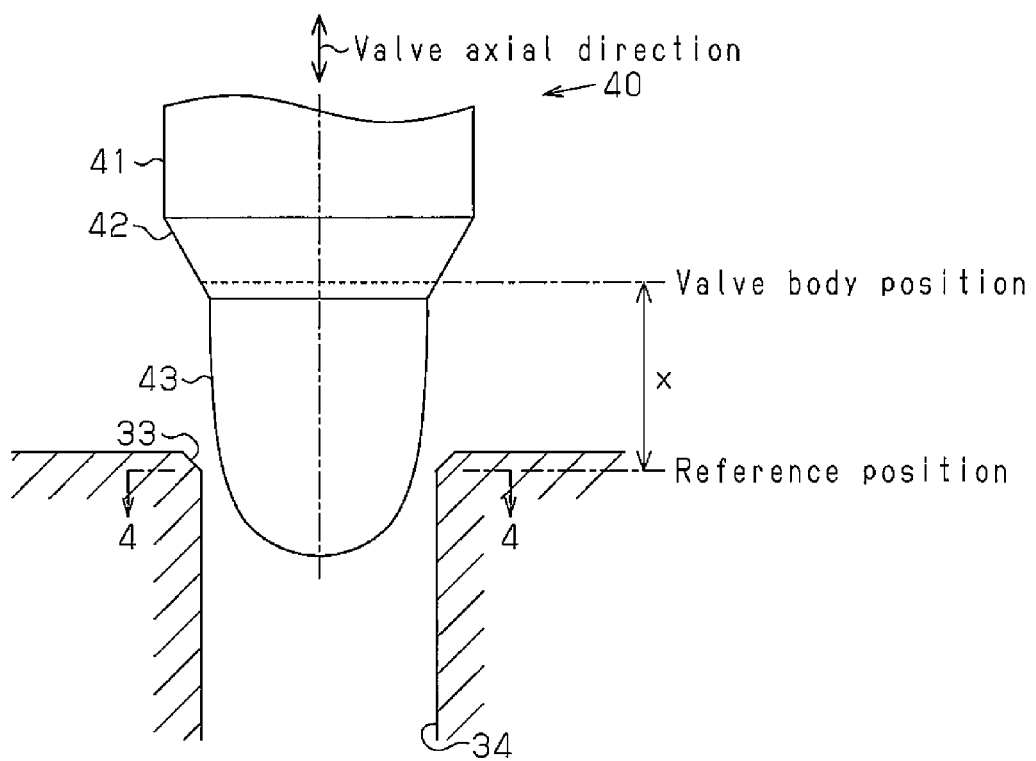
Figure 4:
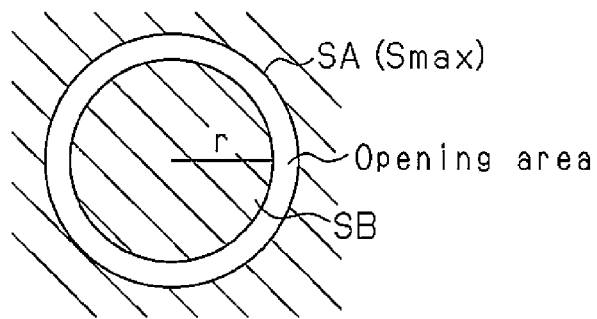
FIG. 4 A cross-sectional view along line 4-4 of FIG. 3(b).

As shown in FIG. 3(a) and FIG. 3(b), the valve body 40 is composed of a valve rod 41, a taper portion 42, and a valve portion 43 formed at a forward end of the valve rod 41 with the taper portion 42 therebetween. The valve rod 41 is fixed to a rotational shaft of the stepping motor 36.

The taper portion 42 totally closes the electronic expansion valve 30 by coming into contact with the valve seat 33. The valve portion 43 is inserted in the valve port 34. The outer diameter of the valve portion 43 is smaller than the inner diameter of the valve port 34, and becomes smaller toward its forward end. A variable throttle portion is formed between the valve portion 43 and the valve seat 33 by allowing the valve portion 43 to move in the axial direction. The valve body 40 and the rotational shaft of the stepping motor 36 are connected together through a rotational conversion mechanism such as screws or gears. The rotational conversion mechanism converts the rotational motion of the rotational shaft of the stepping motor 36 into the linear motion of the valve body 40.

The stepping motor 36 is driven by a pulse signal output from the controller 70. A pulse number and a rotation angle correlate with each other. The rotation angle of the rotational shaft of the stepping motor 36 becomes larger in proportion to the pulse number input to the stepping motor 36. The valve body 40 moves in the axial direction. The movement amount of the valve body 40 is proportional to the rotation angle of the stepping motor 36. The movement amount of the valve body 40, i.e., the movement amount of the valve portion 43 is proportional to the pulse number output to the stepping motor 36 from the controller 70.

As shown in FIG. 1, a temperature sensor 71 and a pressure sensor 72 are connected to the controller 70. The temperature sensor 71 detects the temperature of a refrigerant (hereinafter, referred to as refrigerant temperature), and outputs a refrigerant temperature signal corresponding to the refrigerant temperature to the controller 70. The pressure sensor 72 detects the pressure of a refrigerant (hereinafter, referred to as refrigerant pressure), and outputs a refrigerant pressure signal corresponding to the refrigerant pressure to the controller 70.

The controller 70 counts a pulse number that is output to the stepping motor 36. Additionally, the controller 70 integrates the counted pulse number, and calculates and stores a pulse integrated value. A positive or negative sign is given to the pulse number. When the rotational shaft of the stepping motor 36 negatively rotates in a direction in which the valve portion 43 is inserted into the valve port 34 (hereinafter, referred to as entering direction), the pulse number is a negative value. On the other hand, when the rotational shaft of the stepping motor 36 positively rotates in a direction in which the valve portion 43 comes out of the valve port 34 (hereinafter, referred to as leaving direction), the pulse number is a positive value. In other words, when the rotational shaft of the stepping motor 36 rotates positively and when the valve portion 43 moves in the leaving direction, the pulse integrated value increases. On the other hand, when the rotational shaft of the stepping motor 36 rotates negatively and when the valve portion 43 moves in the entering direction, the pulse integrated value decreases.

As shown in FIG. 3(a), the position of the valve portion 43 located when the taper portion 42 of the valve body 40 comes into contact with the valve seat 33 is set as a reference position. When the valve portion 43 is in the reference position, the pulse integrated value of the controller 70 is reset, and the pulse integrated value becomes "0." As shown in FIG. 3(b), when the valve portion 43 leaves the reference position, a gap is generated between the valve portion 43 and a minimum diameter part of the valve seat 33. The position of the valve portion 43 is equal to the movement distance of the valve portion 43 from the reference position. Therefore, the position of the valve portion 43 is specified by a relationship with the pulse integrated value. The movement amount of the valve portion 43 from the reference position corresponds to the sum total of the pulse number counted during a movement from the reference position to a predetermined position. The position of the valve portion 43 corresponds to the pulse integrated value.

The opening area is the area of the gap between the minimum diameter part of the valve seat 33 and the valve portion 43. More specifically, the opening area is a difference between the area SA of the minimum diameter part of the valve seat 33 and the cross-sectional area SB of the valve portion 43 along a plane including the minimum diameter part of the valve seat 33. The area SA and the cross-sectional area SB are both equivalent to the area of a cross section perpendicular to the axial direction.

When the whole of the valve portion 43 appears from the first pipe 31, the opening area coincides with the area SA of the minimum diameter part of the valve seat 33, and corresponds to a maximum opening area Smax. The opening degree is a ratio (%) between the opening area when the valve portion 43 is in a predetermined position and the maximum opening area Smax. When the taper portion 42 of the valve portion 43 and the valve seat 33 come into contact with each other so as to be totally closed, the opening degree is 0%. When the valve portion 43 completely appears from the first pipe 31, the opening degree is 100%.

The opening degree approximately bears a proportional relationship with the amount of refrigerant flow. When the amount of refrigerant flow is controlled, the opening degree is adjusted. An adjustment to the opening degree is made by use of a pulse integrated value. The opening degree becomes greater in proportion to an increase in the pulse integrated value. On the other hand, an increase aspect of the opening degree resulting from the pulse integrated value depends on a side surface structure of the valve portion 43. Therefore, when the opening degree is adjusted, the controller 70 uses a map showing a relationship between the opening degree and the pulse integrated value.

For example, when the conical valve portion 43 that has an easily formable shape is employed, a map in which the opening degree is expressed as a $C-D\cdot(E-Xa)^2$ function with respect to the pulse integrated value Xa is used. In this case, a contribution of $Xa^2$ to the opening degree is great when the opening degree is adjusted in a small opening degree range. In other words, the amount of variation of the opening degree in a slight variation of the pulse integrated value Xa is great, and therefore it is difficult to finely adjust the opening degree, and it is difficult to finely adjust the flow rate. Therefore, in the present embodiment, a map that enables an easy opening-degree adjustment is assumed with the aim of controlling the opening degree with high accuracy. Additionally, the applicant has devised a valve structure based on this map.

Figure 5A:
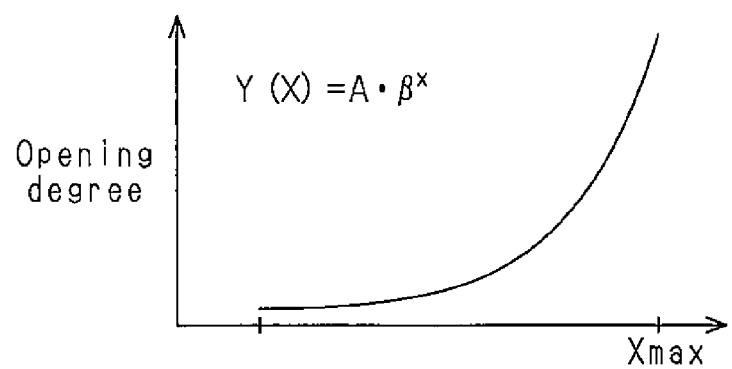
FIG. 5(a) A map showing a relationship between the pulse integrated value and the opening degree, FIG. 5(b) A map showing a relationship between the pulse integrated value and the opening degree ratio.
Figure 5B:
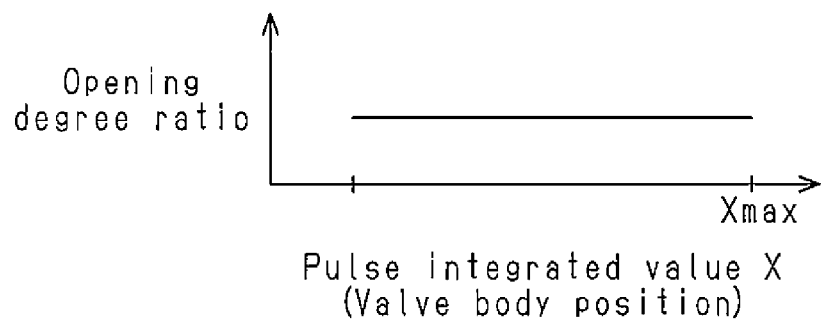

As shown in the map of FIG. 5(a), the opening degree becomes great exponentially with respect to the position of the valve portion 43 corresponding to the pulse integrated value Xa. The opening degree satisfies the following formula (1).

[Numerical Formula 3]

$$Y(X) = A \cdot \beta^X \tag{1}$$

Y: Opening degree
A: Constant
X: Pulse integrated value
β: Value in which Y=100 when X=Maximum pulse integrated value Xmax
Xmax: Maximum value of pulse integrated value, i.e., pulse integrated value corresponding to the position of the valve portion 43 most distant from the reference position.

When X=0, i.e., when the pulse integrated value is 0, the opening degree actually becomes 0%. However, for simplification of calculation, let it be assumed that the opening degree has a predetermined value when X=0.

According to the opening degree Y(X), the following relation is established in two points that differ by a predetermined value δ of the pulse integrated value X (predetermined increase-decrease value of the pulse number).

[Numerical Formula 4]

$$\frac{Y(X+\delta)}{Y(X)} = \beta^\delta \tag{2}$$

When the predetermined value δ is assumed as 1 (one pulse), the opening degree ratio (Y(X+1)/Y(X)) in two points that differ by 1 in the pulse integrated value X becomes "β." The opening degree ratio is constant regardless of the pulse integrated value X. The opening degree ratio is constant with respect to the pulse integrated value X although the opening degree ratio (Y(X+δ)/Y(X)) also becomes great when the predetermined value δ is made great.

In short, the fact that Formula (1) is satisfied is the same as the fact that Formula (2) is satisfied. If a map that satisfies Formula (1) is used, the opening degree ratio will become constant with respect to the position of the valve portion 43 corresponding to the pulse integrated value. When the opening degree ratio is constant over the whole of the pulse integrated value, the variation ratio of the amount of refrigerant flow with respect to the pulse integrated value also becomes constant. Therefore, it is easy to control the amount of refrigerant flow. The opening degree particularly in a small opening degree range increases little by little, and therefore it becomes possible to finely adjust the amount of refrigerant flow.

The fact that the opening degree ratio is constant denotes the fact that the opening degree increases in predetermined-value increments with respect to an increment of the pulse integrated value. For example, when the opening degree ratio is 1.05 and when the initial value of the opening degree is 1%, the opening degree sequentially increases in increments of 1.0%, 1.05%, 1.1025%, 1.15763%, and so on with respect to an increase in the pulse integrated value in increments of 1.

According to this type of map, the amount of refrigerant flow increases exponentially with an increase in the pulse integrated value. In other words, when the pulse integrated value is small, the amount of refrigerant flow is small, and an increment of the amount of refrigerant flow resulting from an increase in the pulse integrated value is also small. On the other hand, when the pulse integrated value is great, the amount of refrigerant flow is great, and an increment of the amount of refrigerant flow resulting from an increase in the pulse integrated value is also great.

Figure 6:
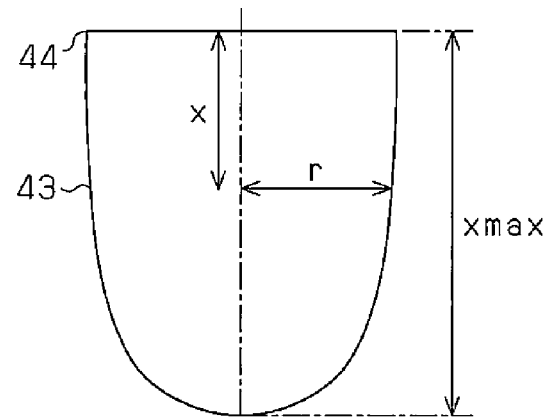
FIG. 6 A partially enlarged side view of a valve portion in the electronic expansion valve.

With reference to FIG. 6, a description will be given of the shape of a visible outline of the valve portion 43 that satisfies Formula (1). The visible outline of a cross section including a valve axis of the valve portion 43 satisfies the following formulas.

[Numerical Formula 5]

$$r = \sqrt{\frac{S\max - B \cdot \beta^x}{\pi}} \tag{3}$$

[Numerical Formula 6]

$$S\max = B \cdot \beta^{x\max} \tag{4}$$

x: Length from a basal part 44 to a part corresponding to the radius r in the valve portion 43
xmax: Length from the basal part 44 to the forward end in the valve portion 43
δ: Opening degree ratio
Smax: Maximum opening area
r: Length (radius) from the valve axis of the valve portion 43 to the side surface
B: Constant.

When a distance by which the valve portion 43 moves in the axial direction per one pulse is set as a unit distance, xmax corresponds to the product of the unit distance and the maximum pulse integrated value Xmax. Additionally, the width of the taper portion 42 is assumed as being extremely small, and the cross-sectional area of the basal part 44 and the maximum opening area Smax are assumed as coinciding with each other.

The valve portion 43 that satisfies the aforementioned formulas satisfies Formula (1) and Formula (2) by means of pulse driving. According to Formula (3), Formula (5) is established.

[Numerical Formula 7]

$$B \cdot \beta^X = S\max - \pi r^2 \tag{5}$$

Formula (5) shows a relationship between r and the distance x when the valve portion 43 is separated from the reference position to the position of the distance x. Formula (5) shows the opening area. Formula (5) shows the opening degree at a predetermined position of the valve portion 43. According to Formula (5), a difference between the maximum opening area Smax and the cross-sectional area ($\pi \cdot r^2$) of the valve portion 43 along a plane including a minimum diameter part of the valve seat 33 is expressed as an exponential function of the position of the valve portion. Formula (5) is the same as Formula (1). In Formula (4), the opening degree ratio is constant regardless of the position of the valve portion 43.

Another example of the valve portion 43 will be described with reference to FIG. 7. A side surface of the valve portion 43 of this example is divided into five regions. A first region RA corresponds to a part in which the opening degree is from 0% to less than 20%. A second region RB corresponds to a part in which the opening degree is from 20% to less than 40%. A third region RC corresponds to a part in which the opening degree is from 40% to less than 60%. A fourth region RD corresponds to a part in which the opening degree is from 60% to less than 80%. A fifth region RE corresponds to a part in which the opening degree is from 80% to 100%.

A side surface of each region is a side surface shaped in a truncated cone. A borderline LS of the side surface of each region is disposed on a virtual curved surface V in which the opening degree ratio becomes constant. More specifically, the virtual curved surface V is a curved surface that satisfies Formula (3) and Formula (4). The side surface of the valve portion 43 is approximated to the virtual curved surface V. In this case, an interval length L that is a length in the axial direction of each region becomes smaller toward the forward end of the valve portion 43 in order of disposition. An angle θ of the side surface of the first region RA satisfies the relation $0 < \tan\theta < 0.2$ with respect to the valve axis of the valve portion 43.

Another example of the valve portion 43 will be described with reference to FIG. 8. A side surface of the valve portion 43 of this example is divided into four regions. A first region RA corresponds to a part in which the opening degree is from 0% to less than 25%. A second region RB corresponds to a part in which the opening degree is from 25% to less than 50%. A third region RC corresponds to a part in which the opening degree is from 50% to less than 75%. A fourth region RD corresponds to a part in which the opening degree is from 75% to 100%.

A side surface of each region is a side surface shaped in a truncated cone. A borderline LS of the side surface of each region is disposed on a virtual curved surface V in which the opening degree ratio becomes constant. More specifically, the virtual curved surface V is a curved surface that satisfies Formula (3) and Formula (4). The side surface of the valve portion 43 is approximated to the virtual curved surface V. In this case, an interval length L that is a length in the axial direction of each region becomes smaller toward the forward end of the valve portion 43 in order of disposition. An angle θ of the side surface of the first region RA satisfies the relation $0 < \tan\theta < 0.2$ with respect to the valve axis of the valve portion 43.

Next, control of the amount of refrigerant flow will be described. In the air conditioner 1, the amount of refrigerant flow is adjusted based on refrigerant pressure, refrigerant temperature, etc. The amount of refrigerant flow is adjusted by adjusting the opening degree of the electronic expansion valve 30. A required opening degree is calculated by the controller 70 based on refrigerant pressure, refrigerant temperature, etc. The opening degree of the electronic expansion valve 30 is adjusted to correspond to the required opening degree. The required opening degree is updated by PID control one after another, and is adjusted each time.

After determining the required opening degree, the controller 70 makes an adjustment so that the opening degree of the electronic expansion valve 30 coincides with the required opening degree. More specifically, the controller 70 determines a correction pulse value that is a pulse integrated value corresponding to the required opening degree while using a control map. Thereafter, the controller 70 reads an actual pulse value that is a pulse integrated value when the required opening degree is commanded, and a difference between the correction pulse value and the actual pulse value is calculated. Thereafter, the controller 70 outputs a pulse signal corresponding to this difference to the stepping motor 36 and drives the valve portion 43. The controller 70 thus allows the opening degree of the electronic expansion valve 30 to coincide with the required opening degree.

Figure 9:
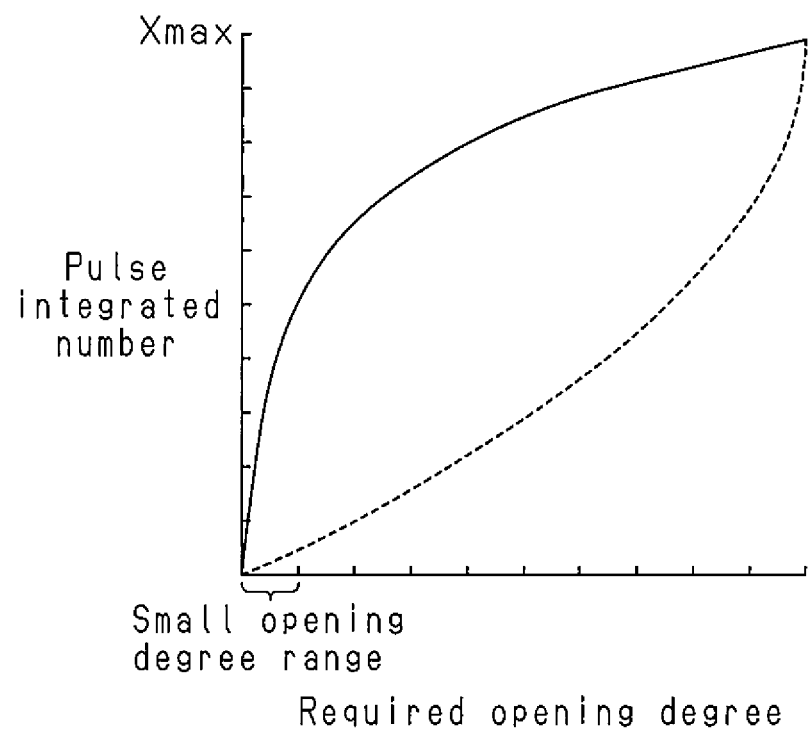
FIG. 9 A control map used to control the electronic expansion valve.

Next, the control map will be described with reference to FIG. 9. The control map of FIG. 9 is substantially the same as the map of FIG. 5(a). In the control map, the opening degree ratio becomes constant regardless of the magnitude of the pulse integrated value. Herein, the abscissa axis indicates required opening degrees, and the ordinate axis indicates pulse integrated values.

Next, a description will be given of a control map relative to the electronic expansion valve 30 of the present embodiment in comparison with an electronic expansion valve having a conventional structure. The broken line of FIG. 9 shows a control map of an electronic expansion valve having a conventional structure. The conventionally structured electronic expansion valve has a valve portion shaped in a cone or a truncated cone. In this type of valve portion, the opening degree becomes greater in proportion to the square of the movement amount of the valve portion when the valve portion moves in a direction coming out of the valve port in accordance with a pulse integrated value. Therefore, it is difficult to change the required opening degree little by little when the required opening degree is small. As shown in FIG. 9, the pulse integrated value corresponding to a small opening degree range that is from 0% to 10% of the required opening degree is 1/10 or less of the maximum pulse integrated value.

On the other hand, in the electronic expansion valve 30 of the present embodiment, the opening degree is arranged so as to increase exponentially. Therefore, as shown in FIG. 9, the pulse integrated value corresponding to the small opening degree range occupies about ½ of the maximum pulse integrated value. Therefore, in the small opening degree range, the valve portion 43 can be controlled by use of pulse numbers more than in the conventional structure, and the opening degree can be finely adjusted. As a result, the amount of refrigerant flow can be controlled highly accurately.

As described below, according to the present embodiment, the following effects can be achieved.

(1) The opening degree ratio is constant when a gap is formed between the side surface of the valve portion 43 and the valve seat 33. According to this arrangement, the side surface of the valve portion 43 is formed as above, and therefore the opening area increases at a fixed ratio when the valve portion 43 is moved. Therefore, the variation ratio of the amount of refrigerant flow becomes constant. Therefore, the amount of refrigerant flow can be finely adjusted.

(2) The side surface of the valve portion 43 is divided into three or more regions in the axial direction. Additionally, the borderline of each region is disposed on the virtual curved surface V in which the opening degree ratio becomes constant. According to this arrangement, the side surface of each region is formed on and along the virtual curved surface V. In other words, the side surface of the valve portion 43 is approximated to the virtual curved surface V. As a result, the variation ratio of the amount of refrigerant flow becomes substantially constant over the moving range of the valve portion 43. Therefore, the amount of refrigerant flow can be finely adjusted.

Figure 7:
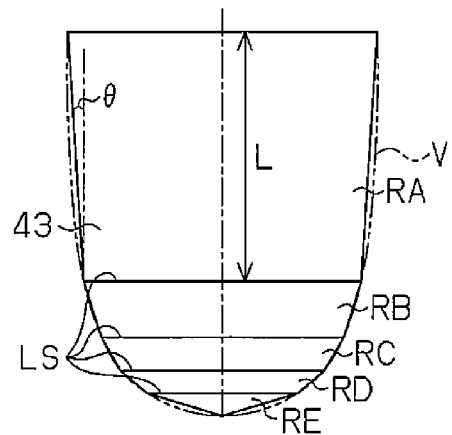
FIG. 7 A partial side view showing a valve portion according to a modification.

(3) In the modification shown in FIG. 7, the interval length L of each region of the side surface of the valve portion becomes smaller toward the forward end of the valve portion 43 in order of disposition. According to this arrangement, the amount of variation with respect to the movement amount of the valve portion 43 becomes greater in proportion to an increase in the opening degree, and becomes smaller in proportion to a decrease in the opening degree. In other words, in a small opening degree range, the amount of refrigerant flow can be adjusted with higher accuracy than in a large opening degree range. Additionally, the valve portion 43 can be made shorter than in an arrangement in which the interval length L of each region does not become smaller toward the forward end of the valve portion 43 in order of disposition.

(4) The visible outline of a cross section including the valve axis of the valve portion 43 satisfies the relation shown in Formula (3) and Formula (4). According to this arrangement, the side surface is formed with a curved surface, and the opening degree ratio is β in the moving range of the valve portion 43. Therefore, a variation in the flow rate of a refrigerant can be made substantially constant over the moving range of the valve portion 43.

Figure 8:
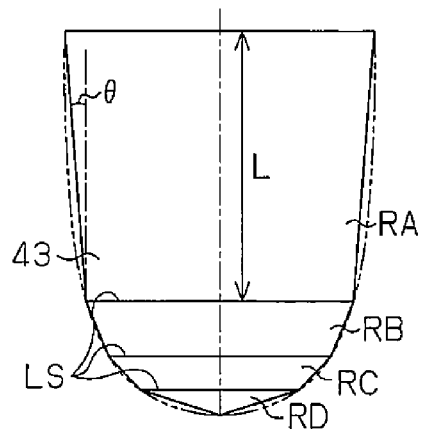
FIG. 8 A partial side view showing a valve portion according to a modification.

(5) In the modification shown in FIG. 8, the aspect of the side surface of the valve portion 43 varies whenever the valve portion 43 moves and the opening degree increases by 25%. Additionally, each borderline is disposed on the virtual curved surface V in which the opening degree ratio becomes constant. Therefore, the valve portion 43 can be more easily formed than in a case in which the side surface of the valve portion 43 is a curved surface. Additionally, the flow-rate variation ratio can be made substantially constant over the moving range of the valve portion 43.

(6) In the modification shown in FIG. 8, the aspect of the side surface of the valve portion 43 varies whenever the valve portion 43 moves and the opening degree increases by 20%. Additionally, each borderline is disposed on the virtual curved surface V in which the opening degree ratio becomes constant. Therefore, the valve portion 43 can be more easily formed than in a case in which the side surface of the valve portion 43 is a curved surface. Additionally, the flow-rate variation ratio can be made substantially constant over the moving range of the valve portion 43.

(7) The angle θ of the side surface of the first region satisfies the relation 0<tan θ<0.2 with respect to the valve axis of the valve portion 43. In this case, the opening area can be increased and decreased little by little with respect to the movement of the valve portion 43. Therefore, the amount of refrigerant flow can be finely adjusted in a small opening degree range.

(8) The air conditioner 1 is provided with the electronic expansion valve 30. According to this arrangement, the amount of refrigerant flow can be finely adjusted, and therefore air-conditioning performance by means of the air conditioner 1 is stabilized.

The present mode can be modified as follows.

Although the entire side surface of the valve portion 43 satisfies Formula (3) and Formula (4) in the present embodiment, only a part of the side surface may satisfy Formula (3) and Formula (4). In this case, the opening ratio in at least one part of the side surface of the valve portion 43 becomes constant. Therefore, in the part satisfying Formulas (3) and (4) of the side surface of the valve portion 43, the amount of refrigerant flow can be controlled with high accuracy.

For example, if the length from the basal part 44 to the forward end of the valve portion 43 is set as 100 and if the position of the basal part is set as 0, Formula (3) and Formula (4) may be satisfied in the range of 1 to 25. The fact that the opening degree ratio is made constant only in a predetermined region denotes that the flow rate is almost zero in the position 0, and has a technical meaning when the opening degree is not controlled in a minimum opening degree range or when a fine adjustment of the opening degree is less frequently made in the range of 25 to 100 in the position.

Although the shape of the side surface of the valve portion 43 is optimized as achieved in the map of Formula (1) in the present embodiment, the shape of the valve seat may be optimized instead of the shape of the side surface of the valve portion 43. Additionally, both the shape of the valve portion 43 and the shape of the valve seat 33 may be optimized as achieved in the map of Formula (1).

Although the side surface of the valve portion 43 is divided into five or four surface parts in each modification shown in FIGS. 7 and 8, it may be divided into six or more surface parts or may be divided into three surface parts. In any case, a polyhedron consisting of surfaces of each region is formed so that the entire side surface of the valve portion 43 expands with respect to a virtual conical shape composed of a bottom surface and a forward end of the valve portion 43.

The invention claimed is:

1. An electronic expansion valve comprising:
a valve body whose forward end is provided with a valve portion;
a valve seat that forms a variable throttle portion between the valve portion and the valve seat by allowing the valve body to move in an axial direction; and
a stepping motor that moves the valve body in accordance with a pulse number,
wherein when an area of a cross section of a gap formed between the valve portion and the valve seat and that is perpendicular to the axial direction is defined as an opening area and when an area ratio between the opening area in which the pulse number has not yet been increased and decreased and the opening area in which the pulse number has already been increased and decreased is defined as an opening degree ratio, at least one part of a side surface of the valve portion is shaped so that the opening degree ratio becomes constant.

2. The electronic expansion valve according to claim 1, wherein the side surface of the valve portion is divided into three or more regions in the axial direction, and a borderline of each of the regions is disposed on a virtual curved surface in which the opening degree ratio becomes constant.

3. The electronic expansion valve according to claim 2, wherein when a length in the axial direction of each of the regions is defined as an interval length, the interval length of each region becomes smaller toward a forward end of the valve portion in order of disposition of the regions.

4. The electronic expansion valve according to claim 1, wherein when a maximum value of the opening area is defined as a maximum opening area and when a percentage of the opening area with respect to the maximum opening area is defined as an opening degree, the side surface of the valve portion is divided into:
a first region that corresponds to a part in which the opening degree is from 0% to less than 25%;
a second region that corresponds to a part in which the opening degree is from 25% to less than 50%;
a third region that corresponds to a part in which the opening degree is from 50% to less than 75%; and
a fourth region that corresponds to a part in which the opening degree is from 75% to 100%, and
wherein the side surface of each region is a side surface shaped in a truncated cone, and the borderline of each region is disposed on a virtual curved surface in which the opening degree ratio becomes constant.

5. The electronic expansion valve according to claim 1, wherein when a maximum value of the opening area is defined as a maximum opening area and when a percentage of the opening area with respect to the maximum opening area is defined as an opening degree, the side surface of the valve portion is divided into:
  a first region that corresponds to a part in which the opening degree is from 0% to less than 20%;
  a second region that corresponds to a part in which the opening degree is from 20% to less than 40%;
  a third region that corresponds to a part in which the opening degree is from 40% to less than 60%;
  a fourth region that corresponds to a part in which the opening degree is from 60% to less than 80%; and
  a fifth region that corresponds to a part in which the opening degree is from 80% to 100%, and
  wherein the side surface of each region is a side surface shaped in a truncated cone, and the borderline of each region is disposed on a virtual curved surface in which the opening degree ratio becomes constant.

6. The electronic expansion valve according to claim 1, wherein a visible outline of a cross section including a valve axis of the valve portion satisfies a relation expressed by the two following formulas:

$$r = \sqrt{\frac{S\max - B \cdot \beta^x}{\pi}}$$ [Numerical Formula 1]

$$S\max = B \cdot \beta^{x\max}$$

(wherein x is a length from a basal part of the valve seat to a part corresponding to radius r in the axial direction of the valve portion, xmax is a length from the basal part to the forward end of the valve portion, β is an opening degree ratio, Smax is a maximum opening area, and r is a length (radius) from the valve axis to the side surface of the valve portion).

7. An electronic expansion valve comprising:
  a valve body whose forward end is provided with a valve portion;
  a valve seat that forms a variable throttle portion between the valve portion and the valve seat by allowing the valve body to move in an axial direction; and
  a stepping motor that moves the valve body in accordance with a pulse number,
  wherein, in a region at least from a basal part to ⅕ of an interval between the basal part and the forward end of the side surface of the valve portion, an angle θ with respect to the valve axis of the valve portion satisfies the following formula:

0<tan θ<0.2    [Numerical Formula 2]

8. An air conditioner including the electronic expansion valve according to claim 1.

9. The electronic expansion valve according claim 2, wherein when a maximum value of the opening area is defined as a maximum opening area and when a percentage of the opening area with respect to the maximum opening area is defined as an opening degree, the side surface of the valve portion is divided into:
  a first region that corresponds to a part in which the opening degree is from 0% to less than 25%;
  a second region that corresponds to a part in which the opening degree is from 25% to less than 50%;
  a third region that corresponds to a part in which the opening degree is from 50% to less than 75%; and
  a fourth region that corresponds to a part in which the opening degree is from 75% to 100%, and
  wherein the side surface of each region is a side surface shaped in a truncated cone, and the borderline of each region is disposed on a virtual curved surface in which the opening degree ratio becomes constant.

10. The electronic expansion valve according to claim 3, wherein when a maximum value of the opening area is defined as a maximum opening area and when a percentage of the opening area with respect to the maximum opening area is defined as an opening degree, the side surface of the valve portion is divided into:
  a first region that corresponds to a part in which the opening degree is from 0% to less than 25%;
  a second region that corresponds to a part in which the opening degree is from 25% to less than 50%;
  a third region that corresponds to a part in which the opening degree is from 50% to less than 75%; and
  a fourth region that corresponds to a part in which the opening degree is from 75% to 100%, and
  wherein the side surface of each region is a side surface shaped in a truncated cone, and the borderline of each region is disposed on a virtual curved surface in which the opening degree ratio becomes constant.

11. The electronic expansion valve according to claim 2, wherein when a maximum value of the opening area is defined as a maximum opening area and when a percentage of the opening area with respect to the maximum opening area is defined as an opening degree, the side surface of the valve portion is divided into:
  a first region that corresponds to a part in which the opening degree is from 0% to less than 20%;
  a second region that corresponds to a part in which the opening degree is from 20% to less than 40%;
  a third region that corresponds to a part in which the opening degree is from 40% to less than 60%;
  a fourth region that corresponds to a part in which the opening degree is from 60% to less than 80%; and
  a fifth region that corresponds to a part in which the opening degree is from 80% to 100%, and
  wherein the side surface of each region is a side surface shaped in a truncated cone, and the borderline of each region is disposed on a virtual curved surface in which the opening degree ratio becomes constant.

12. The electronic expansion valve according to claim 3, wherein when a maximum value of the opening area is defined as a maximum opening area and when a percentage of the opening area with respect to the maximum opening area is defined as an opening degree, the side surface of the valve portion is divided into:
  a first region that corresponds to a part in which the opening degree is from 0% to less than 20%;
  a second region that corresponds to a part in which the opening degree is from 20% to less than 40%;
  a third region that corresponds to a part in which the opening degree is from 40% to less than 60%;
  a fourth region that corresponds to a part in which the opening degree is from 60% to less than 80%; and
  a fifth region that corresponds to a part in which the opening degree is from 80% to 100%, and
  wherein the side surface of each region is a side surface shaped in a truncated cone, and the borderline of each region is disposed on a virtual curved surface in which the opening degree ratio becomes constant.

13. An air conditioner including the electronic expansion valve according claim 2.

14. An air conditioner including the electronic expansion valve according to claim 3.

15. An air conditioner including the electronic expansion valve according to claim 4.

16. An air conditioner including the electronic expansion valve according to claim 5.

17. An air conditioner including the electronic expansion valve according to claim 6.

18. An air conditioner including the electronic expansion valve according to claim 7.

* * * * *